US008160911B2

(12) United States Patent
Lau et al.

(10) Patent No.: US 8,160,911 B2
(45) Date of Patent: Apr. 17, 2012

(54) PROJECT MANAGEMENT APPLICATIONS UTILIZING SUMMARY TASKS FOR TOP-DOWN PROJECT PLANNING

(75) Inventors: Bonny P. Lau, Bellevue, WA (US); Mohammad Yakoob Shahdad, Bellevue, WA (US); Peter De Vries, Seattle, WA (US); Alice Pritikin Steinglass, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 12/468,663

(22) Filed: May 19, 2009

(65) Prior Publication Data

US 2010/0299171 A1 Nov. 25, 2010

(51) Int. Cl.
*G06F 17/00* (2006.01)
(52) U.S. Cl. ...................................... 705/7.16
(58) Field of Classification Search .................. 705/7.16
See application file for complete search history.

(56) References Cited

U.S. PATENT DOCUMENTS

| | | | |
|---|---|---|---|
| 5,907,829 A | 5/1999 | Kida | |
| 6,138,141 A | 10/2000 | DeSimone et al. | |
| 6,154,753 A | 11/2000 | McFarland | |
| 6,424,983 B1 | 7/2002 | Schabes et al. | 715/257 |
| 6,442,567 B1 | 8/2002 | Retallick et al. | 1/1 |
| 6,687,678 B1 | 2/2004 | Yorimatsu | |
| 6,839,722 B2 | 1/2005 | Buchner | |
| 6,889,196 B1 | 5/2005 | Clark | 705/9 |
| 6,901,407 B2 | 5/2005 | Curns et al. | |
| 6,944,622 B1 | 9/2005 | Mitchell et al. | |
| 7,194,695 B1 | 3/2007 | Racine et al. | 715/780 |
| 7,249,042 B1 | 7/2007 | Doerr et al. | |
| 7,305,392 B1 | 12/2007 | Abrams et al. | 1/1 |
| 7,415,393 B1 | 8/2008 | Peña-Mora et al. | |
| 2001/0029460 A1 | 10/2001 | Yonemitsu | |
| 2003/0046220 A1 | 3/2003 | Kamiya | 705/37 |
| 2004/0054566 A1 | 3/2004 | J'Maev | 705/7 |
| 2005/0080715 A1 | 4/2005 | McHale et al. | 705/37 |

(Continued)

FOREIGN PATENT DOCUMENTS

KR 20100027147 A1 3/2010

(Continued)

OTHER PUBLICATIONS

International Search Report issued Dec. 1, 2010 in PCT/US2010/034618, filed May 12, 2010.

(Continued)

*Primary Examiner* — Thomas Dixon
(74) *Attorney, Agent, or Firm* — Merchant & Gould P.C.

(57) ABSTRACT

Embodiments of the present invention are directed toward providing a method utilizing project management software for creating a project plan utilizing a top-down strategy allowing a user to describe high-level objectives before filling in details for the underlying tasks of which the high-level objectives are comprised. As an alternative to basing summary task dates and durations solely on subtask data, the present invention allows a user to enter dates and duration values into summary tasks regardless of when the corresponding subtasks occur. By utilizing a top-down project management approach, embodiments of the present invention promote utilizing summary tasks as a starting point of project planning. Users are able to input high-level objectives of a project when more specific details of subtasks are unknown. Because summary task data is not rolled-up from the subtask data, a user may specify details such as dates and durations of subtasks at a later time.

17 Claims, 12 Drawing Sheets

U.S. PATENT DOCUMENTS

| | | | |
|---|---|---|---|
| 2005/0138631 A1 | 6/2005 | Bellotti et al. | 719/310 |
| 2005/0160084 A1 | 7/2005 | Barrett | |
| 2005/0197999 A1 | 9/2005 | Kumar | 707/1 |
| 2005/0216111 A1 | 9/2005 | Ooshima et al. | |
| 2005/0278208 A1 | 12/2005 | Schultz | |
| 2006/0004618 A1 | 1/2006 | Brixius | |
| 2006/0029079 A1 | 2/2006 | Cohen et al. | 370/395.4 |
| 2006/0070019 A1 | 3/2006 | Vishnumurty | |
| 2006/0070020 A1 | 3/2006 | Puttaswamy et al. | |
| 2006/0136241 A1 | 6/2006 | De Vries | |
| 2006/0140192 A1 | 6/2006 | Jain et al. | 370/395.4 |
| 2006/0200372 A1 | 9/2006 | O'Cull et al. | |
| 2006/0235690 A1 | 10/2006 | Tomasic et al. | |
| 2006/0293939 A1 | 12/2006 | Sun et al. | |
| 2007/0055688 A1 | 3/2007 | Blattner | |
| 2007/0083552 A1 | 4/2007 | Allen et al. | |
| 2007/0192748 A1* | 8/2007 | Martin et al. | 715/856 |
| 2007/0245300 A1 | 10/2007 | Chan et al. | |
| 2008/0082956 A1* | 4/2008 | Gura et al. | 717/101 |
| 2008/0141145 A1 | 6/2008 | Klausmeier | 715/751 |
| 2008/0221946 A1* | 9/2008 | Balon | 705/7 |
| 2008/0228739 A1 | 9/2008 | Motoyama et al. | 707/4 |
| 2009/0006430 A1 | 1/2009 | Steinglass et al. | 707/100 |
| 2009/0048896 A1 | 2/2009 | Anandan | |
| 2009/0287523 A1* | 11/2009 | Lau et al. | 705/8 |
| 2009/0327020 A1* | 12/2009 | de Vries et al. | 705/9 |
| 2010/0010856 A1 | 1/2010 | Chua et al. | 705/8 |
| 2010/0070328 A1* | 3/2010 | Motoyama et al. | 705/9 |

FOREIGN PATENT DOCUMENTS

| | | |
|---|---|---|
| WO | WO 2009/005942 A1 | 1/2009 |
| WO | WO 2010/135122 A2 | 11/2010 |

OTHER PUBLICATIONS

U.S. Official Action mailed Jan. 22, 2010 cited in U.S. Appl. No. 11/770,702.

Non-Final Office Action in U.S. Appl. No. 11/770,702, mailed Mar. 29, 2011; 27 pages.

U.S. Official Action mailed Nov. 9, 2010 cited in U.S. Appl. No. 11/770,702.

Applied Software Project Management, http://www.stellman-greene.com/aspm/content/view/18/38/, pp. 1-3 (Copyright 2005).

International Search Report and Written Opinion for PCT/US2008/065993, mailed Nov. 12, 2008, 10 pages.

Myers, K. et al., "PASSAT: A User-centric Planning Framework;" *Proceedings of the 3rd International NASA Workshop on Planning and Scheduling for Space*, pp. 1-10 (2002).

Oracle Project Management; http://www.oracle.com/applications/project-management.html; pp. 1-5 (admitted by Applicants as prior art as of Jun. 27, 2007).

U.S. Official Action mailed Jun. 24, 2009 cited in U.S. Appl. No. 11/770,702.

View and Track Scheduling Factors, http://office.microsoft.com/en-us/project/HA101130861033.aspx, pp. 1-4 (Copyright 2009).

WBS Chart Pro 4.7, http://download.cnet.com/WBS-Chart-Pro/3000-2076_4-10072965.html?tag=mncol, pp. 1-7 (Copyright 2009).

U.S. Official Action mailed May 21, 2010 cited in U.S. Appl. No. 11/770,702.

* cited by examiner

FIG 1

| | Task Mode ▸ | Task Name ▸ | Duration ▸ | Start ▸ | Finish ▸ | '09 | Feb 8, '09 | Feb 22, '09 | Mar 8, '09 | Mar 22, '09 |
|---|---|---|---|---|---|---|---|---|---|---|
| 1 | | Analysis/Software Requirements | 2 wks 216 | Wed 2/4/09 217 | Tue 2/17/09 218 | | ▬219 | | | |
| 2 | | | | | | | | | | |
| 3 | | Design Phase 125 | 1 wk 226 | | | | ▪229 | | | |
| 4 | | | | | | | | | | |
| 5 | | Development 135 | | | | | | | | |
| 6 | | | | | | | | | | |
| 7 | | Testing Phase 145 | TBD | | Fri 3/20/09 238 | | | | [ ] | |

FIG 2

| | | Task Mode ▼ | Task Name | Duration ▼ | Start ▼ | Finish ▼ | '09 | Feb 1, '09 | Feb 8, '09 | Feb 15, '09 | Feb 22, '09 |
|---|---|---|---|---|---|---|---|---|---|---|---|
| | | | | | | | T S | S M T W T F S | S M T W T F S | S M T W T F S | S M T W T F S |
| 1 | ◯ | | Analysis/Software Requirements | 2 wks | Wed 2/4/09 | Tue 2/17/09 | | | | 219 | |
| 2 | | ♦ | Conduct needs analysis | 3 days | Wed 2/4/09 | Fri 2/6/09 | | Jack 329 | | | |
| 3 | | ♦ | Draft software specifications | 3 days | Mon 2/9/09 | Wed 2/11/09 | | | Jack 339 | | |
| 4 | | ♦ | Develop budget | 3 days | Wed 2/4/09 | Fri 2/6/09 | | Colin 349 | | | |
| 5 | | ♦ | Develop delivery timeline | 2 days | Thu 2/12/09 | Fri 2/13/09 | | | Colin 359 | | |
| 6 | | | | | | | | | | | |
| 7 | | | | | | | | | | | |

FIG 3

PROJECT MANAGEMENT APPLICATIONS UTILIZING SUMMARY TASKS FOR TOP-DOWN PROJECT PLANNING

RELATED APPLICATIONS

This application is related to U.S. patent application Ser. No. 11/770,702, filed Jun. 28, 2007, and entitled, "SCHEDULING APPLICATION ALLOWING FREEFORM DATA ENTRY," which is hereby incorporated by reference in its entirety.

BACKGROUND

Project management software assists project managers in developing plans, assigning resources to tasks, tracking progress, managing budgets and analyzing workloads. At the initiation phase of a project, project managers often begin their planning by breaking their schedules down into a set of high-level phases. The timeframe associated with these phases are often associated with key dates or milestones that have been passed down to them from their organization or are associated with commitments to/from external parties. These dates are usually determined very early on, often before most other details in a project are established. Once project managers have a high-level understanding of the overall timeline, they may then proceed to identify more specific work items underneath each phase that will help complete that phase's objectives. This method is considered a top-down approach to project management. Alternatively, a bottom-up approach involves first identifying all the detail work items in the project, then creating logical groupings to identify when and how long each group of tasks will take to execute.

Project management software helps project managers in organizing their schedule through the ability to create task hierarchies. Project phases may be modeled as summary tasks, under which a list of related tasks or subtasks may exist. Together, the subtasks help accomplish the high-level objectives of the phases.

According to some project management applications, summary tasks are roll-ups of their subtasks. The dates and durations of summary tasks are calculated by the software. A summary task's start date is the earliest start of its sub-tasks, the finish date is the latest finish date of its subtasks, and its duration is the total span of its subtasks. Typically, a summary task may not start before its earliest subtask, nor finish after its latest subtask. Because summary tasks are always calculated based on the details of their subtasks, it is difficult to schedule a project phase at a specific date before the details of its subtasks have been fully defined.

Another limitation with some typical management applications is that there is not a way to maintain key dates which project managers may not have control over (e.g., a timeframe budget for a particular phase in a project as approved by an organization; deadlines as required by a project customer). When a task becomes the summary task for a group of subtasks, its dates may be overwritten by the calculated roll-up of the subtasks. If the dates of a subtask are altered, the dates associated with the summary task follow suit.

In addition, often a project manager is given a specific time budget for completing a phase, and the work items within that phase may not initially fully occupy the approved timeframe. In case of slippages, to increase the scope of the project if time allows, or for various other reasons, a project manager may want to utilize the remaining left over time as a buffer. Project managers may be prevented from modeling this buffer time in a project if the summary tasks automatically lengthen and shorten with the subtasks. Likewise, there may not be an easy way to show if a subtask has slipped past its original planned date of the summary phase. If a subtask's finish date is delayed, the associated summary task duration lengthens accordingly.

It is with respect to these considerations and others that the various embodiments of the present invention have been made.

SUMMARY

Embodiments of the present invention provide for creating a project plan in a top-down strategy that allows a user to describe high-level objectives before filling in details for the underlying tasks of which the high-level objectives are comprised. A user may manipulate data associated with underlying tasks without disturbing the original planned schedule of the high level objectives. Visual indicators may allow a user to identify the differences between planned dates and durations of project phases versus actual calculated roll-up dates of the subtasks. By looking at the project plan, a user may be able to visually identify key performance indicators, such as buffers and slippage, of a high level objective.

The details of one or more techniques are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Figure 1:
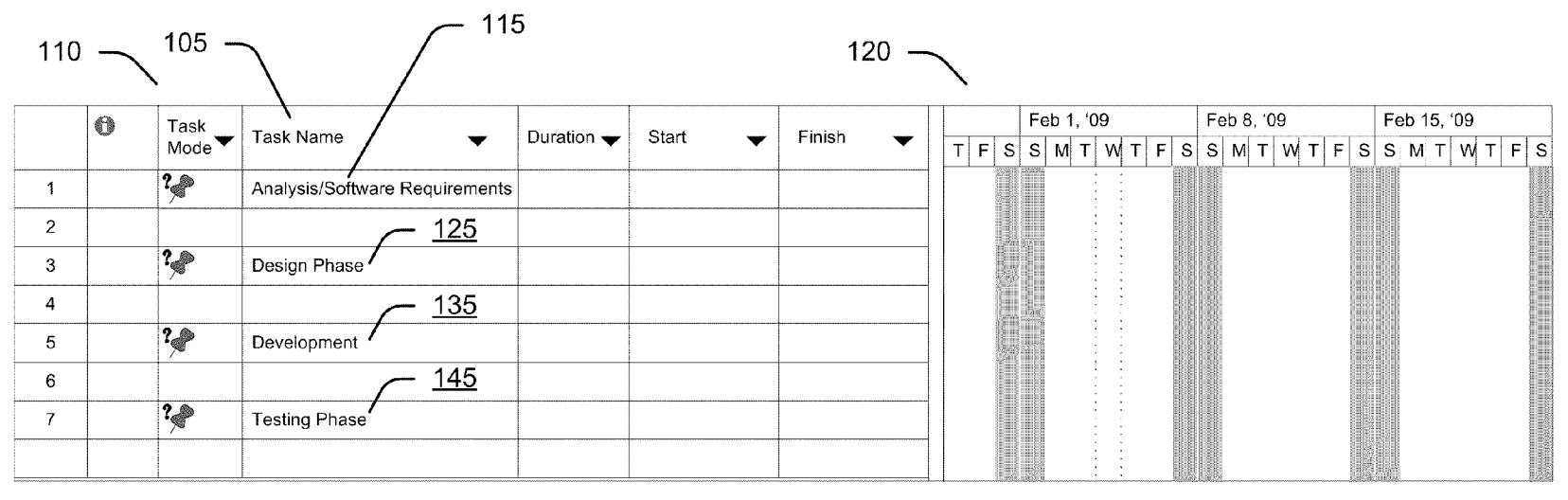

FIG. 1 is an illustration of a screenshot of an example project plan after initial scoping of high level objectives.

FIG. 2 is an illustration of a screenshot of an example project plan after high level dates and durations of high level objectives have been entered.

FIG. 3 is an illustration of a screenshot of an example project plan after work items for an example Analysis Phase have been entered.

DETAILED DESCRIPTION

Figure 4:
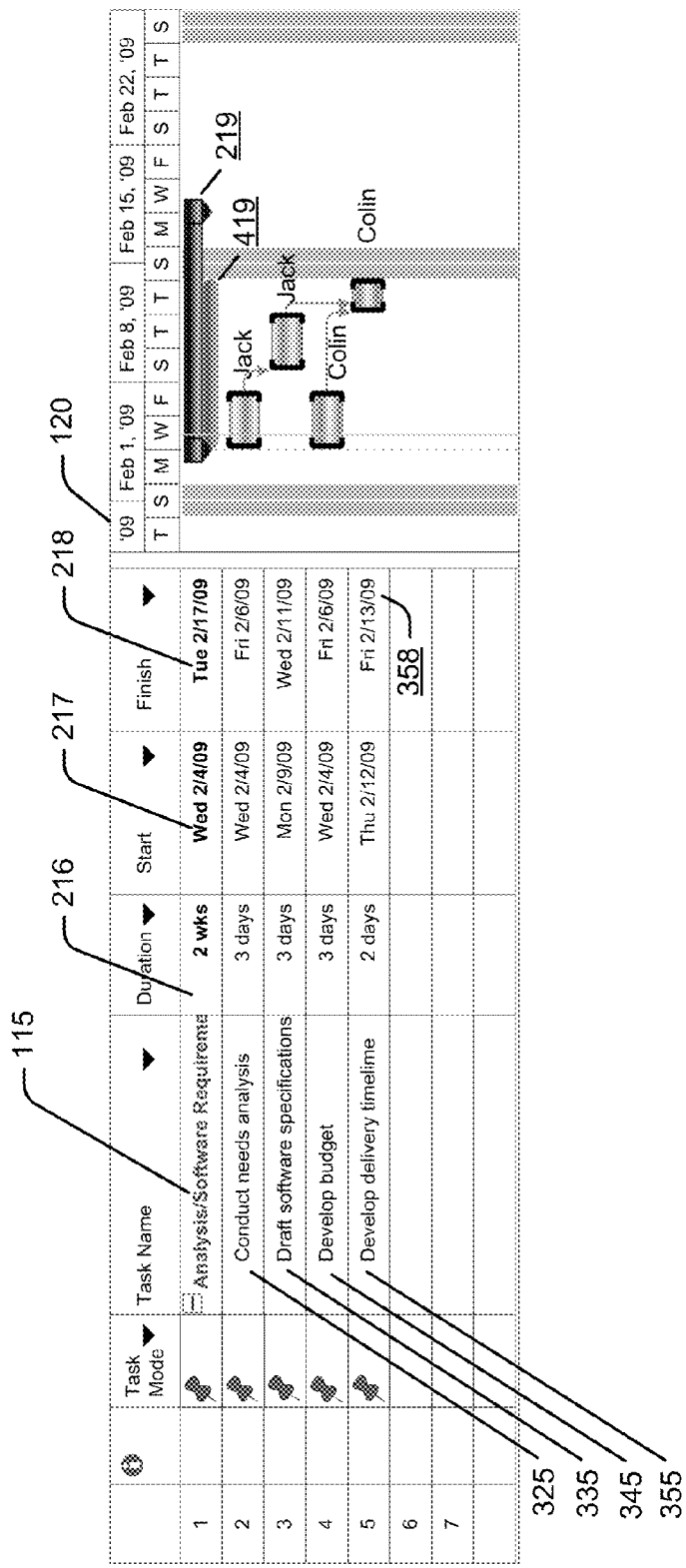
FIG. 4 is an illustration of a screenshot of an example project plan displaying a rollup bar after moving a list of work items under a high level objective.

As briefly described above, embodiments of the present invention are directed to creating a project plan utilizing a top-down strategy that allows a user to describe high-level objectives before filling in details for the underlying tasks of which the high-level objectives are comprised. As an alternative to basing summary task dates and durations on subtask data, the present invention provides a more flexible approach so that users are able to enter dates and duration values into summary tasks regardless of when the corresponding subtasks may be occurring. By utilizing a top-down project management approach, embodiments of the present invention enhance the creation of a summary task as a starting point of project planning. Users are able to input high-level objectives of a project when more specific details of subtasks are unknown. Because summary task data is not rolled-up from the subtask date, a user may specify details such as dates and durations of subtasks at a later time.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIGS. 1-11 are example screenshots illustrating how a project plan may look during different planning stages and in various scenarios utilizing embodiments of the present invention. FIGS. 1-11 are meant to be used as aids and examples to describe embodiments of the present invention and are not limiting of the scope of the invention as claimed. FIG. 1 is an example of how a project plan may look at an initial planning stage. The example screenshot shown in FIG. 1 shows a table 110 on the left-hand side that a user may use to enter data and which may display various information depending upon the view a user may choose. A user may choose which fields he/she may want to display in the table 110 (e.g., Task Mode, Task Name, Duration, Start Date, Finish Date, etc.). For example, the table 110 looks similar to a spreadsheet application worksheet, and also works similarly to a typical spreadsheet application. The right-hand side of the example screenshot is a chart view 120. In this example, the chart 120 is a Gantt Chart. If a user selects Gantt Chart view, the tasks of the project may be displayed on the left-hand side, and an illustration of their relationship to one another and the schedule using Gantt bars may be displayed on the right-hand side. A suitable software application for providing the example project plan illustrated in FIGS. 1-11 is PROJECT by MICROSOFT CORPORATION of Redmond, Wash. In the example and as illustrated in FIG. 1, a user has entered four high level objectives of a project (i.e., Analysis/Software Requirements 115, Design Phase 125, Development 135, and Testing Phase 145), which are shown below the field "Task Name" 105. At this point in a project plan, a user may only know the high level objectives 115,125,135,145 of a project. When a user enters additional tasks underneath a high level objective task, the high level objective task 115,125,135,145 may then become a summary task.

As more information is available to a user, he/she may then start inserting additional data into the table 110. According to an embodiment, flexibility is allowed in specifying any or none of the start date, finish date, or duration of a high level objective task or summary task. FIG. 2 is an example screenshot showing how a project plan may look after additional analysis. In this example, the user knows the exact timeframe in which the first task, Analysis/Software Requirements 115, can happen, so he/she may enter the data he/she knows such as the duration 216, start date 217, and finish date 218 of the corresponding task under the appropriate fields 205,206,207 in the table 110. Accordingly, when the user enters this information into the table 110, a graphical representation of the entered data may be shown in the form of a Gantt bar 219 in the Gantt chart 120.

For the second task, Design Phase 125, he/she only knows the total budgeted time allotted, which in this example is one week. The user may enter a duration 226 of one week under the Duration field 205 for the Design Phase 125. According to an embodiment, a graphical representation of the known data may be displayed in a chart 120. If only some of the data is known, the graphical representation may be an incomplete graphic, displaying only the known data. For example, referring still to FIG. 2, the only known data of the task Design Phase 125 is that it is allotted a duration of one week. As a result, in the Gantt Chart 120, a graphical representation of the duration 229 may be shown as a faded bar without a definite start date 206 or finish date 207. As should be appreciated, there may be various ways in which to represent incomplete data. As more data is defined and entered, the corresponding bar 229 will update accordingly.

Referring still to the example, at this stage in the planning process, the user may not know how long it may take to complete the third task "Development" 135; however, he/she may know that he/she has a deadline of Mar. 20, 2009. To represent this known piece of data in the table 110, the user may enter a finish date 238 of Fri Mar. 20, 2009 under the Finish field 207 for the Development task 135. For the fourth task "Testing Phase" 145, the user may not know any information yet; therefore, he/she may leave the fields 205,206, 207 blank or enter TBD (to be determined) to signify that more data will be determined after further analysis.

According to an embodiment, once high level objectives 115,125,135,145 have been planned, a user may then enter additional details of individual subtasks without affecting the original plans for the high level objectives. Continuing on with the example project plan above, FIG. 3 illustrates how a project plan may look when a user enters additional data into the table 110. In this example screenshot, the user enters a list of work items 325,335,345,355 under the Analysis/Software Requirements task 115. As the user inputs data into the Duration 205, Start Date 206, and Finish Date 207 fields, the Gantt Chart 120 provides a graphical representation of the task list, updated with Gantt bars 219,329,339,349,359 showing the durations 205 of the project's tasks across the timeline 310.

If a user moves a list of work items 325,335,345,355 under a task 115, that task 115 then becomes a summary task. FIG. 4 is a screenshot showing a list of work items 325,335,345, 355 moved under the Analysis/Software Requirements task 115. The Analysis/Software Requirements task 115 is now a summary task, and the work items 325,335,345,355 that have been moved under it are now subtasks. According to an embodiment, the present invention enables a summary task to have a finish date later than its subtasks' finish date. This allows a user to model situations wherein the subtasks 324, 335,345,355 underneath a summary task 115 do not use up all of the planned budget time 216 of the given project phase. According to another embodiment, when a user creates a summary task by moving a group of subtasks under a given task, a combination of information entered by the user of the summary task and the calculated roll-up of the subtasks may be utilized to fill in the summary dates. This allows for user-entered start, finish, or duration information on a task to be preserved when it is converted into a summary task.

The example screenshot of FIG. 4 shows that the original dates of the summary task 115 have been maintained although the total span of its subtasks 325,335,345,355 does not equal the duration of the summary task. According to an embodiment, because a summary task date is not restrained by the roll-up dates of its subtasks, a user is able to model situations wherein the work items underneath a project phase start after the start date of the summary task. Additionally, a user is able to model situations wherein subtasks have headstarts over the planned start dates of their summary tasks.

According to another embodiment, a user may identify the differences between planned dates and durations of summary tasks compared to the actual calculated roll-up of the subtasks' dates. On the Gantt Chart view 120, two Gantt bars 219,419 may be displayed that represent the planned dates and the calculated dates. This allows a user to visually compare the difference between planned dates 219 and calculated dates 419 and identify slippages and/or available buffer times. According to one embodiment, the calculated date Gantt bar 419 may display a visual characteristic to give an indication of whether the calculated date 358 exceeds or does not add up to the planned date 218. For example, if the calculated date 358 is less than the planned date 218, the calculated date Gantt bar 419 may be displayed as blue. Alternatively, if the calculated date 358 exceeds the planned date 218, the calculated date Gantt bar 419 may be displayed as red. A user can glance at a project's Gantt Chart 120, and quickly see if a phase of a project 115 has buffer time or if it is going to slip past its planned finish date 218.

According to another embodiment, if a user places his/her cursor over a summary task's calculated date Gantt bar 419, a pop-up box may be deployed containing text stating how much buffer time or overage time there is for the associated summary task 115. According to another embodiment, both the planned and roll-up dates of a summary task may be provided so that a user may perform a precise comparison between these dates. A user may choose to display both sets of dates on his/her Task sheet view, or programmatically identify the difference through the programming interface provided by the application (i.e., MICROSOFT PROJECT). Prior to the present invention, a summary task's dates were restrained by the roll-up dates of its subtasks. If a user had a planned start or end date of a project phase that did not match the roll-up dates of its subtasks, the user would have to either manually add in a "dummy task" with an artificial start and finish date or add two milestone tasks at the planned start and finish dates of the particular project phase.

Figure 5:
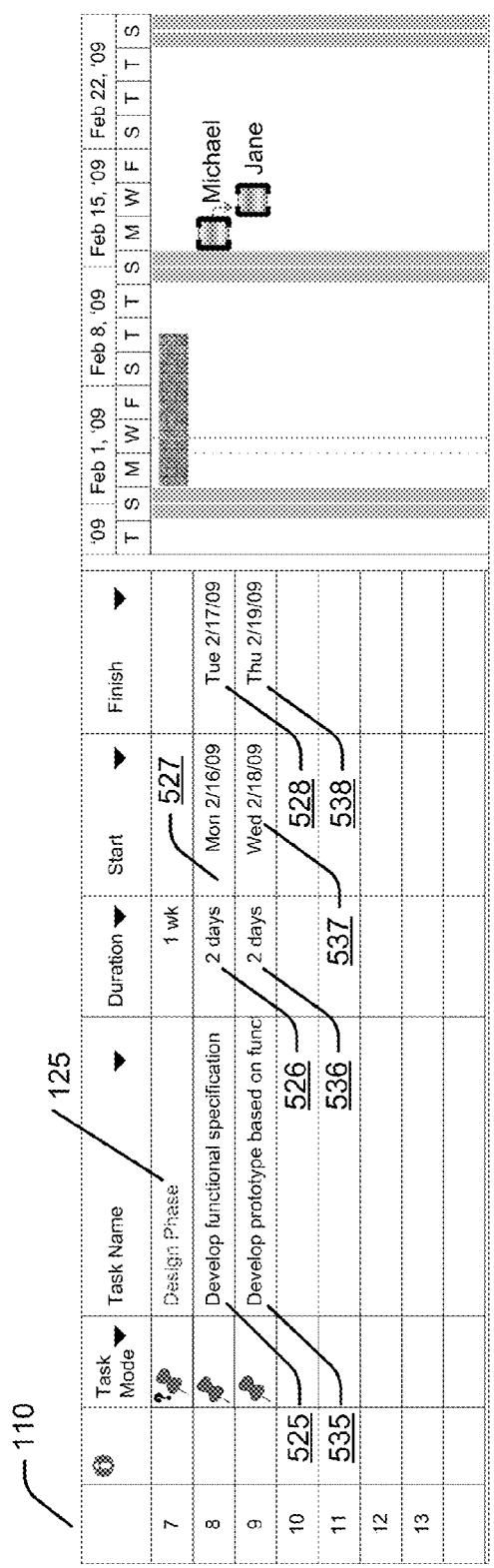
FIG. 5 is an illustration of a screenshot of an example project plan after work items for an example Design Phase have been entered.
Figure 6:
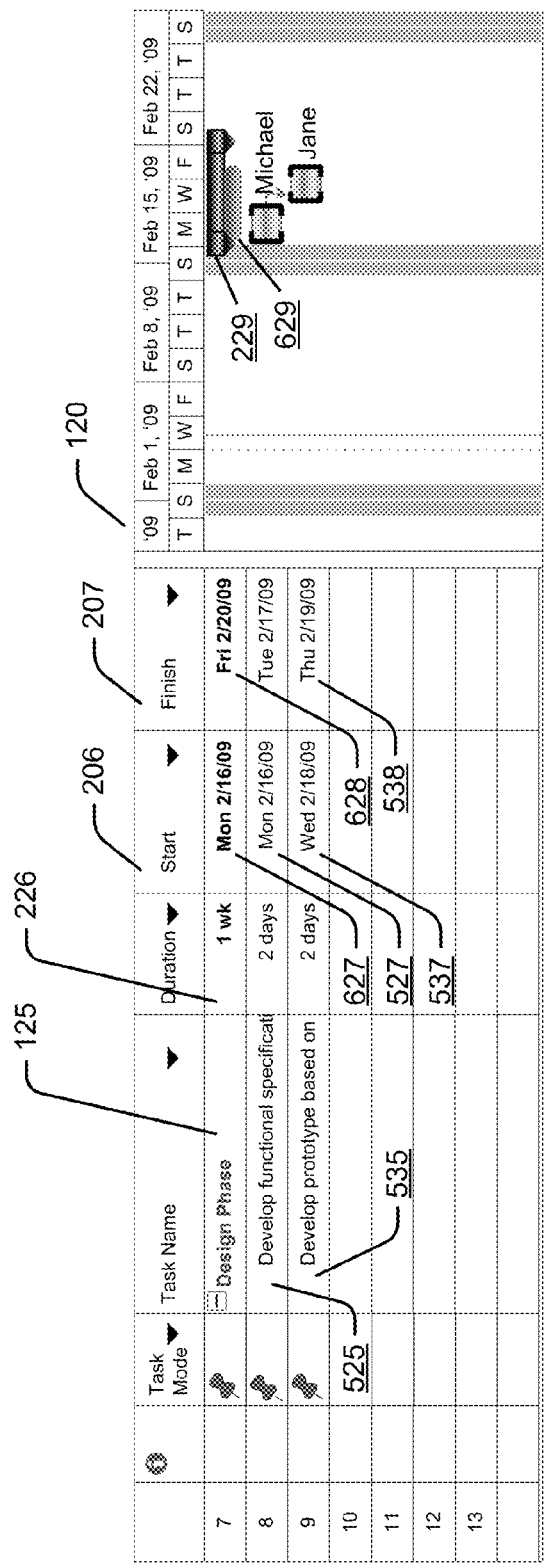
FIG. 6 is an illustration of a screenshot of an example project plan wherein the summary task's dates are a rollup of its subtasks after moving a list of work items under a high level objective.

Referring still to the example project plan, the screenshot in FIG. 5 shows the Design Phase 125. The user has two work tasks 525,535 planned for this phase 125, and has entered them into the table 110. When the user moves the two work tasks 525,535 under the Design Phase task 125, the work tasks become subtasks, and the Design Phase task becomes a summary task. This is shown in the screenshot in FIG. 6. According to an embodiment, if start 206, finish 207, or duration 205 information of a task has not been entered by a user, the invention will fill in the blank fields with values calculated from the subtasks rollup. As shown in FIG. 6, the application has made use of the Start Date 527 of the first subtask 525 and determined that the Design Phase 125 will start on the same day as the earliest subtask 525. When the user started his/her project plan, the only information he/she had at the time for the Design Phase 125 was that is would have a planned duration 226 of one week. He/she did not specify a start date 206 nor a finish date 207. Accordingly, when the user enters a subtask and specifies a start date for that subtask, the application now has some information about when the corresponding summary task should begin.

FIG. 6 shows that the start date 627 and finish date 628 for the Design Phase 125 is automatically filled in when the user embeds the subtasks. In this scenario, the summary task data is rolled up from the subtask data because the summary task date fields 627,628 were left empty. According to an embodiment, a user may toggle between a calculated summary and a top-down summary, and also have a mixture of both types of summary tasks in a plan. As shown in FIG. 6, the Gantt Chart 120 is automatically updated to reflect the entered data. The planned date Gantt bar 229 has changed in appearance from an indistinct bar as shown in FIG. 5 to a defined Gantt bar with a distinct marker indicating the start date 627 and end date 628. Below the planned date Gantt bar 229 is the calculated Gantt bar 629. As indicated by the length and color of the calculated Gantt bar 629, the user can see that the Design Phase 125 contains buffer time.

Figure 7:
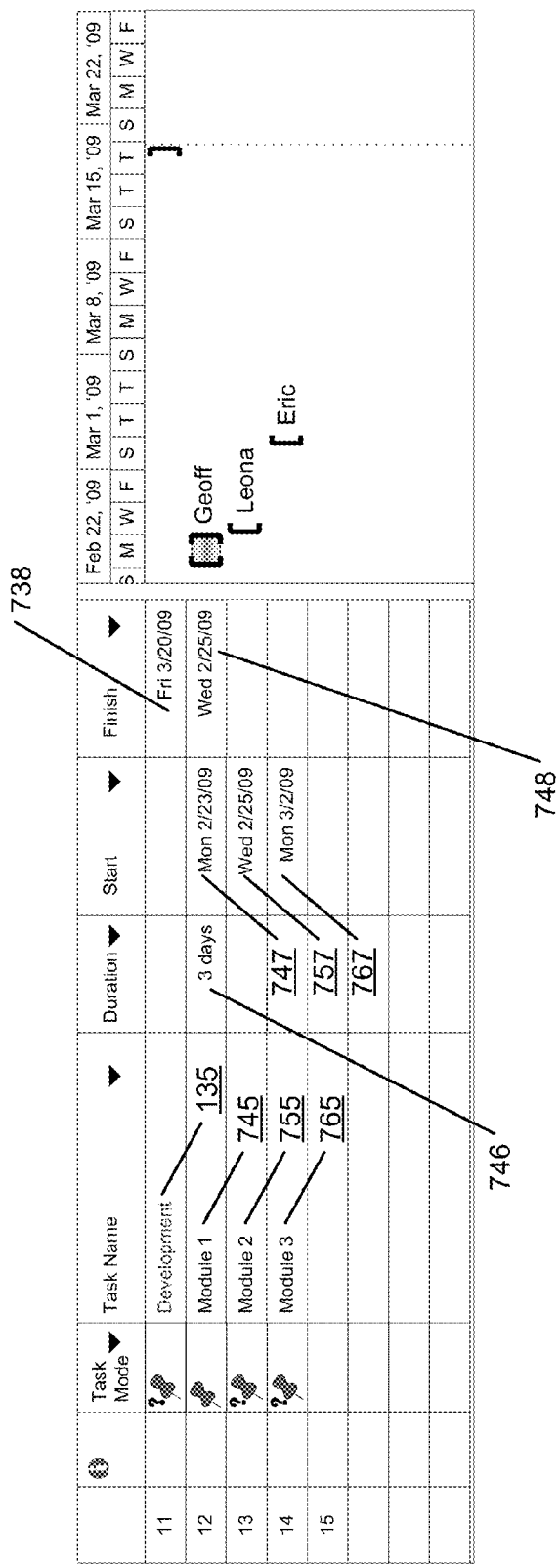
FIG. 7 is an illustration of a screenshot of an example project plan after work items for an example Development Phase have been entered.
Figure 8:
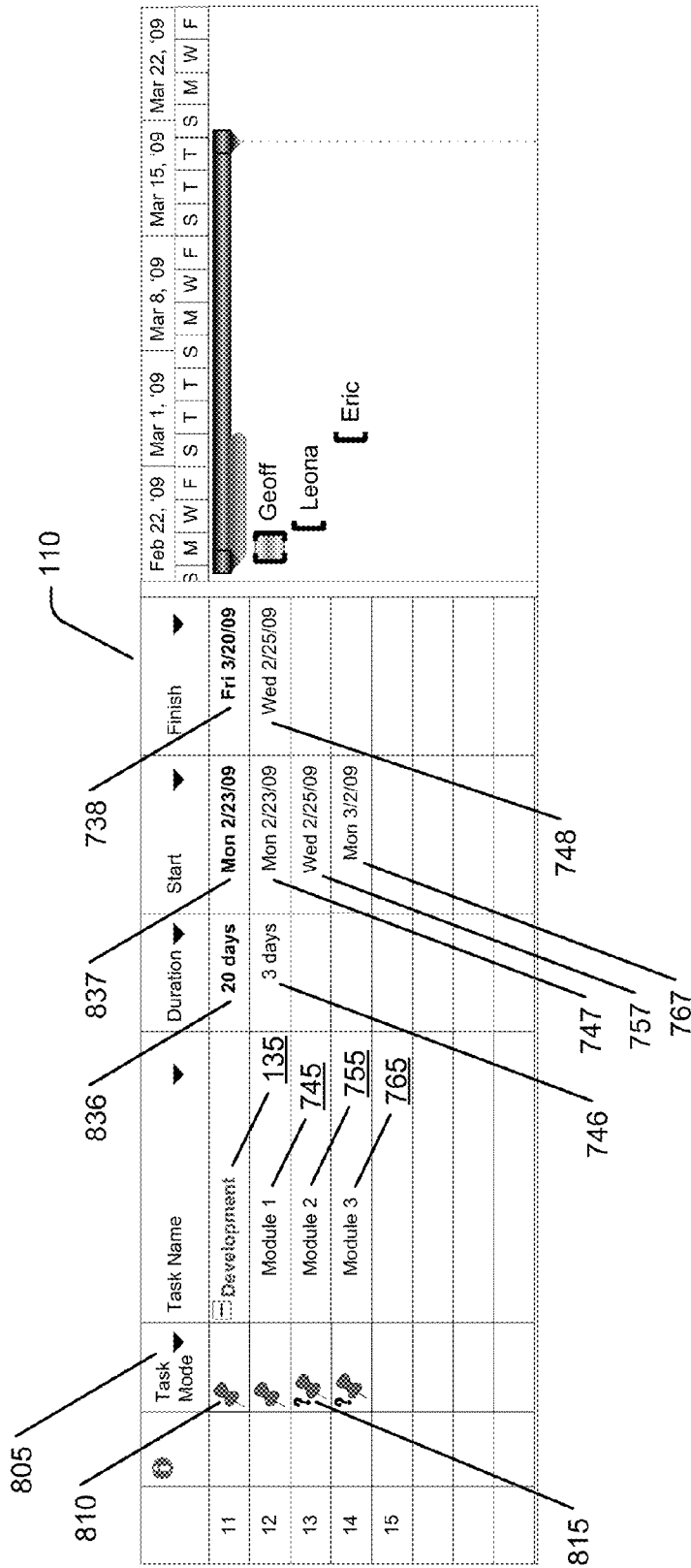
FIG. 8 is an illustration of a screenshot of an example project plan showing how a summary task's date is kept when a list of work items are moved under it.

Continuing on with the example and referring now to FIG. 7, the screenshot of FIG. 7 shows the Development phase 135 which has a finish date 738 of Fri Mar. 20, 2009 in which the user has specified that the phase 135 must finish by. The user has entered several work items 745,755,765 which contain some date information 746,747,748,757,767. As shown in FIG. 8, after the user converts the Development task 135 into a summary task, the Development phase's finish date 738 is maintained and the duration 836 and start date 837 cells have been automatically populated with calculated dates based on the entered data 746,747,748,757,767 of the subtasks 745, 755,765.

According to an embodiment, a visual indication may be provided to indicate whether a task contains manually entered date information (pinned task) or if it is a pure roll-up of its subtasks. As shown in FIG. 8, the visual indication of a pinned task may be an icon, such as a push pin 810 located under the Task Mode field 805 in the table 110. If a task has missing information, an alternative visual indication may be displayed. As shown, the visual indication of a pinned task with missing data may be an icon, such as a push pin and a question mark 815. The push pin 810 (i.e., visual indication) signifies that the user has entered some information. The information may be a duration 205, start date 206, and/or finish date 207. According to an embodiment, if a task is pinned, the entered data for that task is not dependent on the data of subtasks beneath it and will remain constant. An example of this is described below with reference to FIG. 11. If a task has not been assigned any date information and if its dates 205,206, 207 are calculated from its subtask data, a visual indication to represent this will be displayed. The visual representation may be an arrow as shown and described below with reference to FIG. 10.

Figure 9:
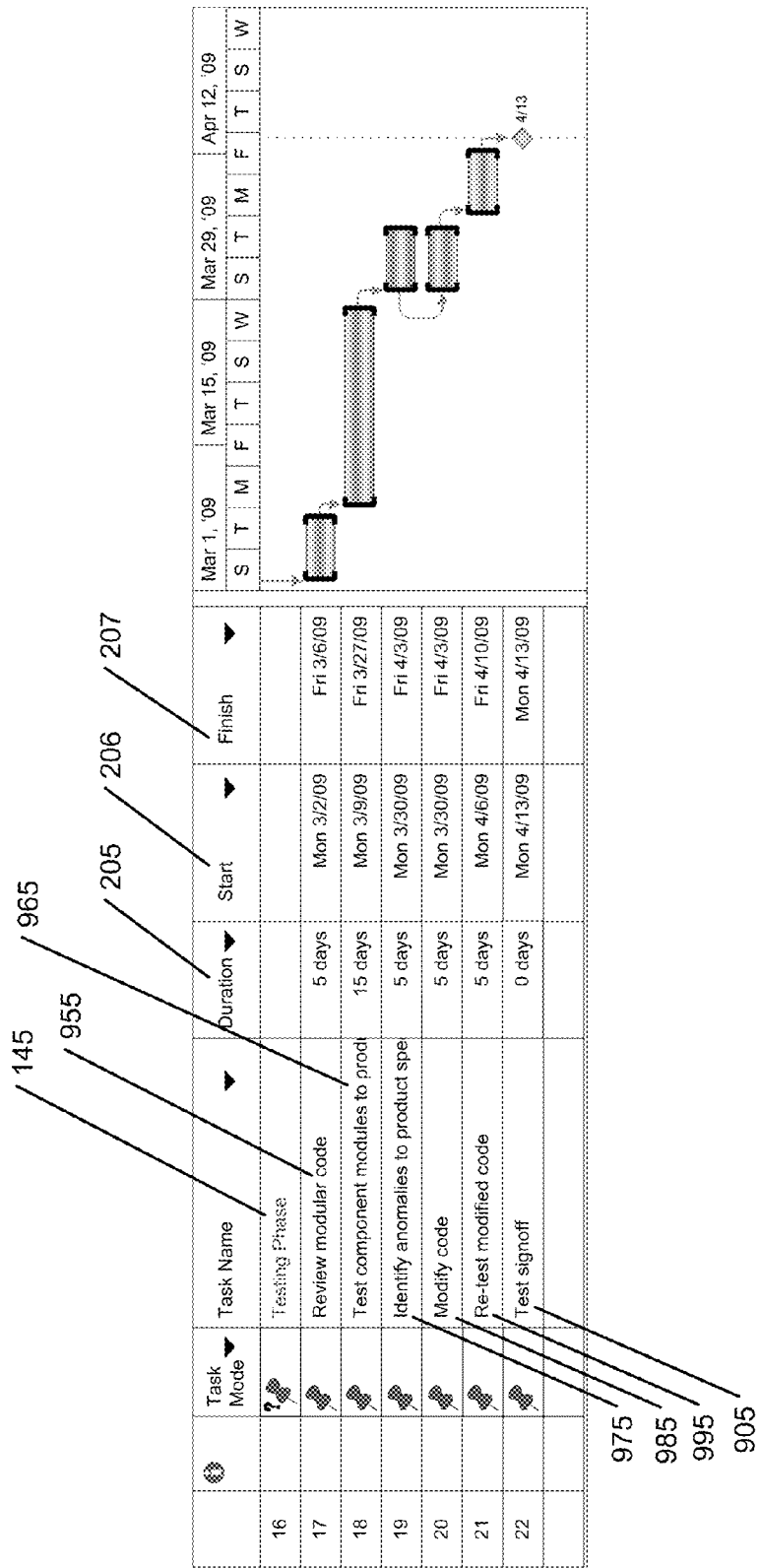
FIG. 9 is an illustration of a screenshot of an example project plan showing a high level objective with no entered data.

Referring now to FIG. 9, the screenshot shows the Testing Phase 145, which is the final stage of the example project.

Figure 10:
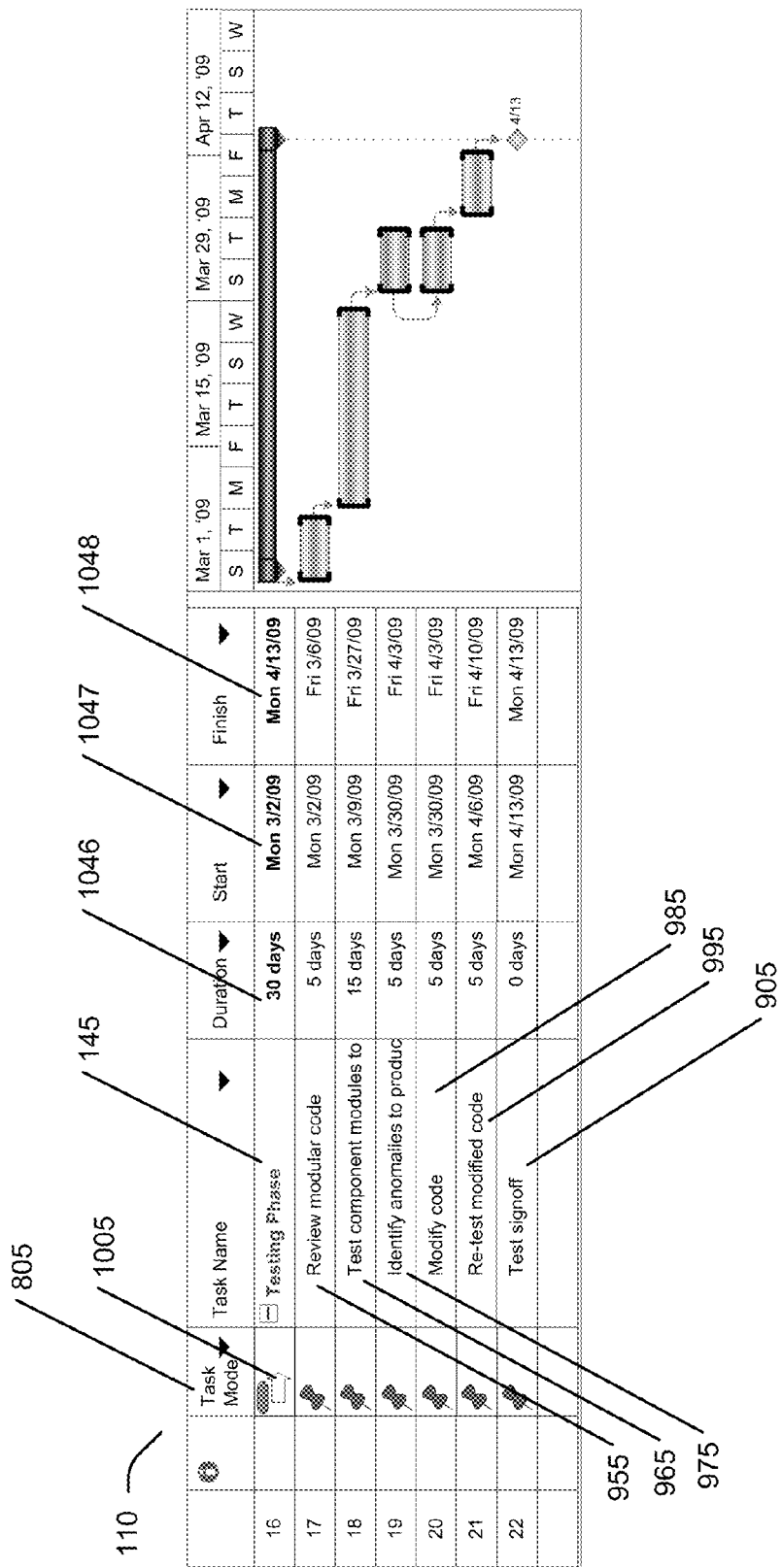
FIG. 10 is an illustration of a screenshot of an example project plan showing the dates for an example Testing Phase are rolled up from the dates of its subtasks.

When the user originally began the project plan, he/she did not know a duration 205, start date 206, or finish date 207. Further in the planning process, in FIG. 9, the user adds work items 955,965,975,985,995,905 and details of those items below the Testing Phase task 145. After converting the Testing Phase task 145 into a summary task, the dates 1047,1048 and duration 1046 are automatically calculated for this summary task 145 from its subtasks 955,965,975,985,995,905 as shown in FIG. 10. As should be appreciated, if a user does not specify any information 205,206,207 for a given task, and if the dates of its subtasks 955,965,975,985,995,905 are modified, the associated rolled-up summary task dates 1046,1047, 1048 will adjust accordingly.

As mentioned previously, a visual representation indicating that a task's dates are a pure roll-up of its subtask data may be displayed. As shown in FIG. 10, an arrow 1005 is shown under the Task Mode 805 field. According to an embodiment, a user may manually pin a task so that its dates to not change if its subtask dates are modified. According to another embodiment, if a summary task's dates have been rolled-up from its subtasks' data, a user may later specify data for that summary task, changing it from an automatically rolled-up task into a manual summary (pinned task). For example, a user may enter a testing phase summary task for which he has not entered any data for, as well as several subtasks of the testing phase, whose dates roll up a duration of thirty days for the testing phase. Later on, the user may find out he has an additional five days allotted to the phase. When the user goes in and manually types thirty-five days into the duration field of the testing phase, it then changes from an automatically scheduled summary task into a manual summary task, or a pinned task. Accordingly, its dates will not change if its subtask dates are modified.

Figure 11:
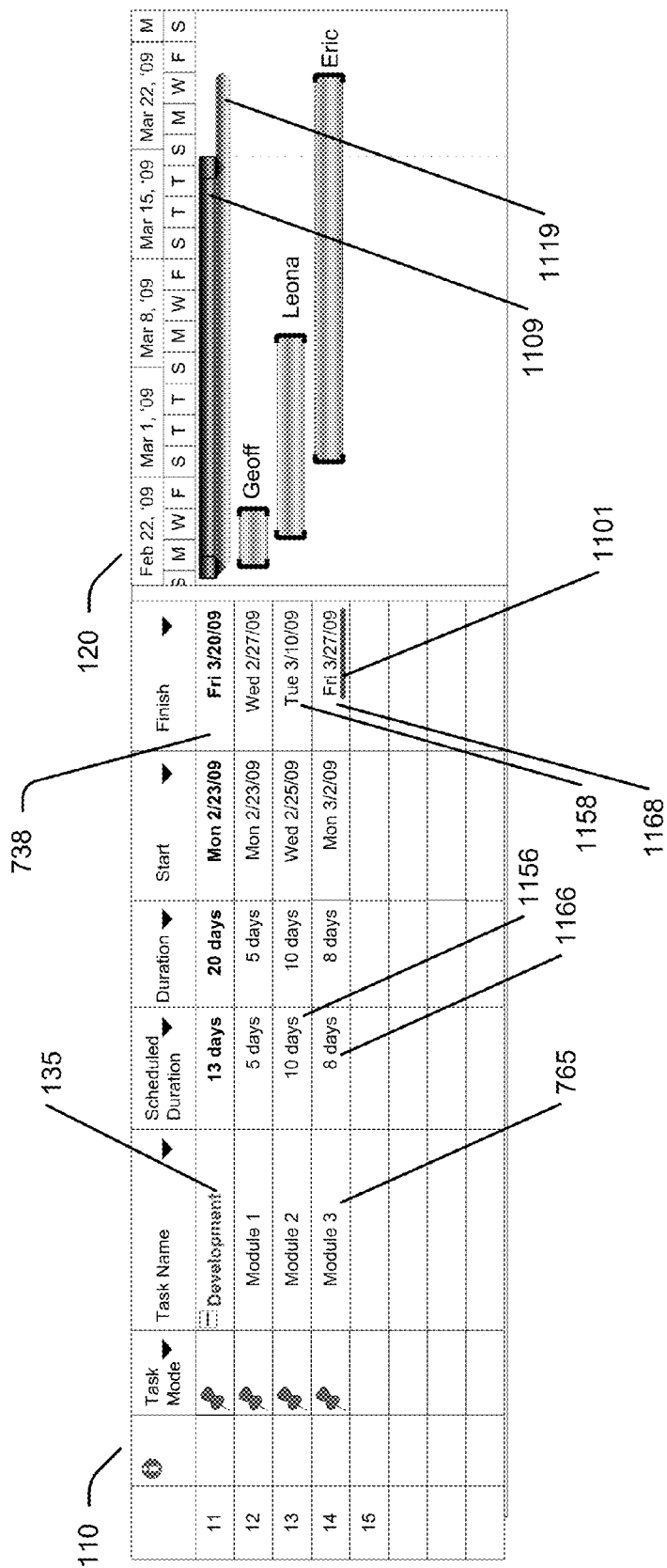
FIG. 11 is an illustration of a screenshot of an example project plan wherein a slippage is occurring in the schedule.

As mentioned previously, if a calculated date exceeds its planned date, the calculated date Gantt bar may be displayed as red to indicate that its subtasks will not be completed by its planned finish date. FIG. 11 illustrates this scenario. In FIG. 11, the example user has updated the project plan from FIG. 8 with additional data 1156,1158,1166,1168. The user has specified a finish date 738 of Fri Mar. 20, 2009 for the Development phase 135; however, the finish date 1168 for its last subtask, Module 3 765, is after this date 738. Several visual indicators are shown to alert the user of the slippage in the schedule. As described above, a scheduled date Gantt bar 1109 and a calculated date Gantt bar 1119 are shown in the Gantt chart 120 of the project plan. The calculated date Gantt bar 1119 is shown extended past the scheduled date Gantt bar 1109 and may also be displayed as red to indicate its overextension of the schedule.

Also shown in FIG. 11, Module 3's 765 finish date 1168 is underlined in red 1101 to indicate that this task 765 is causing the Development phase 135 to finish later than its planned date 738. According to an embodiment, a selectable marking 1101 may be displayed in relation to a piece of data if it contradicts other data within a project. If a user selects the marking 1101 by known methods, information may be displayed, giving the user options on how to modify the data to alleviate any contradictions it may have with other data in the schedule.

Also described previously, if a task is pinned, the entered data for that task is not dependent on the data of subtasks beneath it, and will remain constant. According to an embodiment, the present invention enables a summary task to finish before all of its subtasks' finish dates, allowing a user to model a situation wherein a subtask slips past the planned project phase finish date. FIG. 11 illustrates this scenario. The example Development task 135 is a pinned task because the example user has entered a piece of data for it. In this example, the user has specified a finish date 738 of Fri Mar. 20, 2009. When the user later adds data 1156,1158,1166,1168 to the chart, the finish date 738 for the Development phase 135 remains unchanged although it contradicts the finish date 1168 of its last subtask 765.

Figure 12:
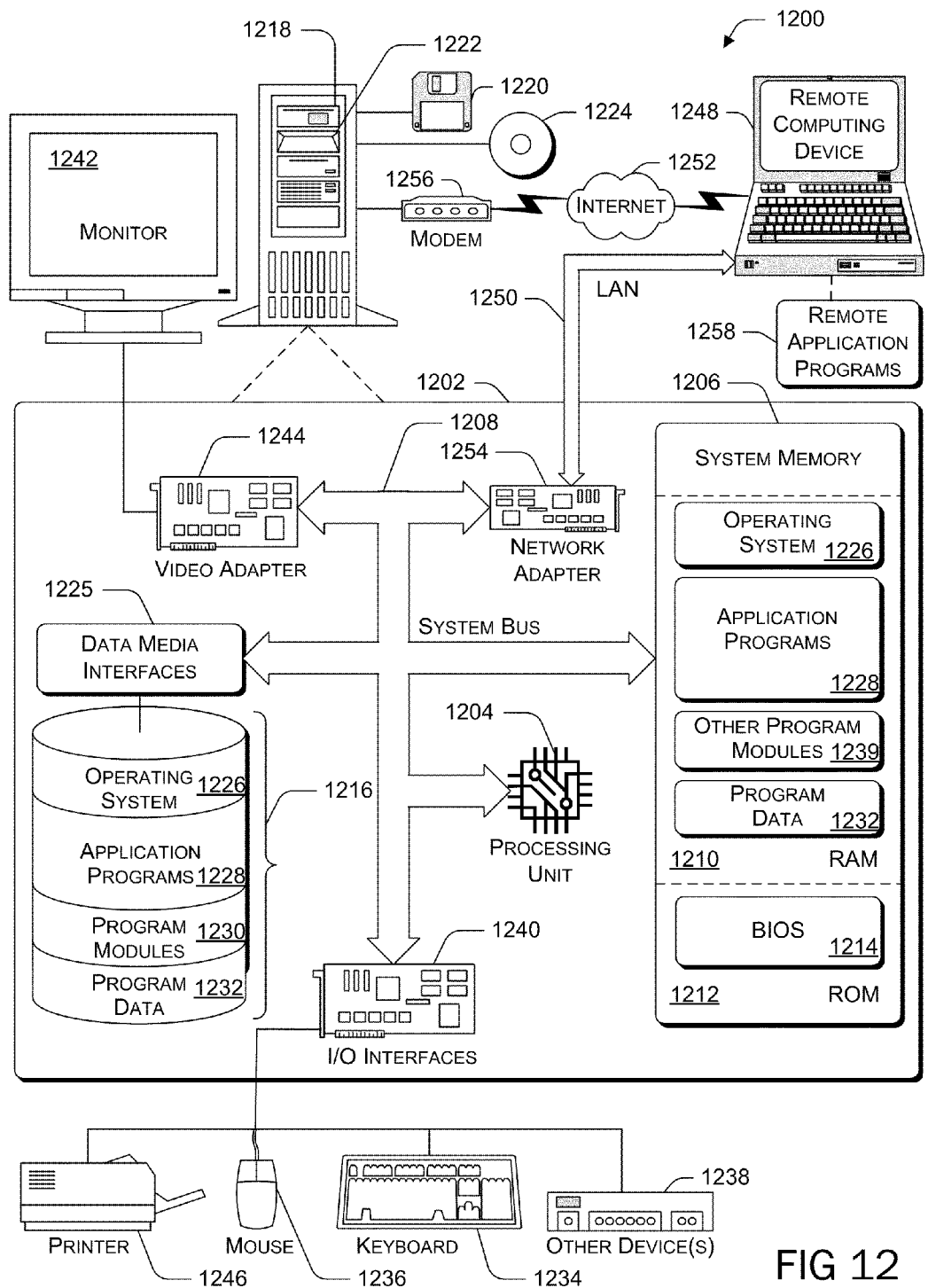
FIG. 12 is a block diagram showing an architecture of an electronic computing device that provides an illustrative operating environment for embodiments of the present invention.

FIG. 12 illustrates a general computer environment 1200, which can be used to implement the techniques described herein. The computer environment 1200 is only one example of a computing environment and is not intended to suggest any limitation as to the scope of use or functionality of the computer and network architectures. Neither should the computer environment 1200 be interpreted as having any dependency or requirement relating to any one or combination of components illustrated in the example computer environment 1200.

Computer environment 1200 includes a general-purpose computing device in the form of a computer 1202. The components of computer 1202 can include, but are not limited to, one or more processors or processing units 1204, system memory 1206, and system bus 1208 that couples various system components including processor 1204 to system memory 1206.

System bus 1208 represents one or more of any of several types of bus structures, including a memory bus or memory controller, a peripheral bus, an accelerated graphics port, and a processor or local bus using any of a variety of bus architectures. By way of example, such architectures can include a Peripheral Component Interconnects (PCI) bus also known as a Mezzanine bus, a PCI Express bus (and the like), a Universal Serial Bus (USB), a Secure Digital (SD) bus, and/or an IEEE 1394, i.e., FireWire, bus.

Computer 1202 may include a variety of computer readable media. Such media can be any available media that is accessible by computer 1202 and includes both volatile and non-volatile media, removable and non-removable media.

System memory 1206 includes computer readable media in the form of volatile memory, such as random access memory (RAM) 1210; and/or non-volatile memory, such as read only memory (ROM) 1212 or flash RAM. Basic input/output system (BIOS) 1214, containing the basic routines that help to transfer information between elements within computer 1202, such as during start-up, is stored in ROM 1212 or flash RAM. RAM 1210 typically contains data and/or program modules that are immediately accessible to and/or presently operated on by processing unit 1204.

Computer 1202 may also include other removable/non-removable, volatile/non-volatile computer storage media. By way of example, FIG. 12 illustrates hard disk drive 1216 for reading from and writing to a non-removable, non-volatile magnetic media (not shown), magnetic disk drive 1218 for reading from and writing to removable, non-volatile magnetic disk 1220 (e.g., a "floppy disk"), and optical disk drive 1222 for reading from and/or writing to a removable, non-volatile optical disk 1224 such as a CD-ROM, DVD-ROM, or other optical media. Hard disk drive 1216, magnetic disk drive 1218, and optical disk drive 1222 are each connected to system bus 1208 by one or more data media interfaces 1225. Alternatively, hard disk drive 1216, magnetic disk drive 1218, and optical disk drive 1222 can be connected to the system bus 1208 by one or more interfaces (not shown).

The disk drives and their associated computer-readable media provide non-volatile storage of computer readable instructions, data structures, program modules, and other data for computer 1202. Although the example illustrates a hard disk 1216, removable magnetic disk 1220, and removable optical disk 1224, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1216, magnetic disk 1220, optical disk 1224, ROM 1212, and/or RAM 1210, including by way of example, operating system 1226, one or more application programs 1228, other program modules 1230, and program data 1232. Each of such operating system 1226, one or more application programs 1228, other program modules 1230, and program data 1232 (or some combination thereof) may implement all or part of the project management embodiments described herein. An example software application with which embodiments of the present invention may be implemented includes PROJECT by MICROSOFT CORPORATION.

A user can enter commands and information into computer 1202 via input devices such as keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to processing unit 1204 via input/output interfaces 1240 that are coupled to system bus 1208, but may be connected by other interface and bus structures, such as a parallel port, game port, or a universal serial bus (USB).

Monitor 1242 or other type of display device can also be connected to the system bus 1208 via an interface, such as video adapter 1244. In addition to monitor 1242, other output peripheral devices can include components such as speakers (not shown) and printer 1246 which can be connected to computer 1202 via I/O interfaces 1240.

Computer 1202 can operate in a networked environment using logical connections to one or more remote computers, such as remote computing device 1248. By way of example, remote computing device 1248 can be a PC, portable computer, a server, a router, a network computer, a peer device or other common network node, and the like. Remote computing device 1248 is illustrated as a portable computer that can include many or all of the elements and features described herein relative to computer 1202. Alternatively, computer 1202 can operate in a non-networked environment as well.

Logical connections between computer 1202 and remote computer 1248 are depicted as a local area network (LAN) 1250 and a general wide area network (WAN) 1252. Such networking environments are commonplace in offices, enterprise-wide computer networks, intranets, and the Internet.

When implemented in a LAN networking environment, computer 1202 is connected to local area network 1250 via network interface or adapter 1254. When implemented in a WAN networking environment, computer 1202 typically includes modem 1256 or other means for establishing communications over wide area network 1252. Modem 1256, which can be internal or external to computer 1202, can be connected to system bus 1208 via I/O interfaces 1240 or other appropriate mechanisms. It is to be appreciated that the illustrated network connections are examples and that other means of establishing at least one communication link between computers 1202 and 1248 can be employed.

In a networked environment, such as that illustrated with computing environment 1200, program modules depicted relative to computer 1202, or portions thereof, may be stored in a remote memory storage device. By way of example, remote application programs 1258 reside on a memory device of remote computer 1248. For purposes of illustration, applications or programs and other executable program components such as the operating system are illustrated herein as discrete blocks, although it is recognized that such programs and components reside at various times in different storage components of computing device 1202, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

As described herein, creating a project plan in a top-down strategy allows a user to describe high-level objectives before filling in details for the underlying tasks of which the high-level objectives are comprised. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method for creating a top down project plan, the method comprising:
   receiving information entered by a user associated with a summary task comprising subtasks;
   determining by a processor executing code stored on a computer-readable medium whether a summary task's start date, finish date, or duration fields contain user-entered information;

when at least one, but no more than two of a summary task's start date, finish date, or duration fields contain user-entered information,
determining a schedule of planned dates for the summary task utilizing summary task information entered by the user in addition to calculated roll-up dates of the summary task's subtask information;
determining when a summary task's calculated roll-up dates contradict planned dates;
when a task's calculated roll-up dates contradict planned dates, preserving the user-entered planned dates; and
displaying the determined summary task schedule in the corresponding fields of the project plan;
wherein when all three of a summary task's start date, finish date, or duration fields contain user-entered information,
preserving the user-entered planned dates;
identifying differences between the planned dates and the roll-up dates of the summary task's subtasks when differences exist; and
displaying an indication of whether a task contains planned dates or when the task contains roll-up dates.

2. The computer-implemented method of claim 1, wherein when no user-entered information is contained in a summary task's start date, finish date, and duration fields,
determining a schedule for the summary task utilizing calculated roll-up dates of the summary task's subtask information; and
displaying the determined summary task schedule in the corresponding fields of the project plan.

3. The computer-implemented method of claim 1, wherein identifying differences between the planned dates and the roll-up dates of the summary task includes providing a planned date Gantt bar and a calculated roll-up date Gantt bar displayed on a project plan Gantt chart.

4. The computer-implemented method of claim 1, wherein identifying differences between the planned dates and the roll-up dates of the summary task includes providing a planned date field and a roll-up date field within a project plan table.

5. The computer-implemented method of claim 1, wherein determining when a summary task's calculated roll-up dates contradict planned dates includes determining whether a summary task start date occurs before all of the start dates of the subtasks of the summary task.

6. The computer-implemented method of claim 1, wherein determining when a summary task's calculated roll-up dates contradict planned dates includes determining whether a summary task start date occurs after all the finish dates of the subtasks of the summary task.

7. The computer-implemented method of claim 1, wherein determining when a summary task's calculated roll-up dates contradict planned dates includes determining whether a summary task finish date occurs after all the finish dates of the subtasks of the summary task.

8. The computer-implemented method of claim 1, wherein determining when a summary task's calculated roll-up dates contradict planned dates includes determining whether a summary task finish date occurs before all the finish dates of the subtasks of the summary task.

9. The computer-implemented method of claim 1, wherein displaying an indication of whether a task contains planned dates or when the task contains roll-up dates includes displaying a push pin icon in association with information displayed for the task when the task contains only planned dates.

10. The computer-implemented method of claim 1, wherein displaying an indication of whether a task contains planned dates or when the task contains roll-up dates includes displaying a push pin icon and a question mark in association with information displayed for the task when the task contains planned dates and roll-up dates.

11. The computer-implemented method of claim 1, wherein displaying an indication of whether a task contains planned dates or when the task contains roll-up dates includes displaying an arrow icon in association with information displayed for the task when the task contains only roll-up dates.

12. A computer-readable storage medium containing computer-executable instructions which when executed by a computer perform a method for creating a top down project plan, the method comprising:
receiving information entered by a user associated with a summary task comprising one or more subtasks;
determining whether a summary task's start date, finish date, or duration fields contain user-entered information;
when at least one, but no more than two of a summary task's start date, finish date, or duration fields contain user-entered information,
determining a schedule of planned dates for the summary task utilizing summary task information entered by the user in addition to calculated roll-up dates of the summary task's subtask information;
determining when a summary task's calculated roll-up dates contradict planned dates; and
when a summary task's calculated roll-up dates contradict planned dates,
preserving the user-entered planned dates; and
identifying differences between the planned dates and the roll-up dates;
displaying the determined summary task schedule in the corresponding fields of the project plan;
but, when no user-entered information is contained in a summary task's start date, finish date, and duration fields,
determining a schedule for the summary task utilizing calculated roll-up dates of the summary task's subtask information; and
displaying the determined summary task schedule in the corresponding fields of the project plan;
wherein when all three of a summary task's start date, finish date, or duration fields contain user-entered information,
preserving the user-entered planned dates; and
identifying any differences between the planned dates and the roll-up dates of the summary tasks' subtasks; and
displaying an indication of whether a task contains planned dates or when the task contains roll-up dates.

13. The computer-readable medium of claim 12,
wherein identifying differences between the planned dates and the roll-up dates of the summary task includes providing a planned date Gantt bar and a calculated roll-up date Gantt bar displayed on a project plan Gantt chart; and
wherein identifying differences between the planned dates and the roll-up dates of the summary task includes providing a planned date field and a roll-up date field within a project plan table.

14. The computer-readable medium of claim 12, wherein determining when a summary task's calculated roll-up dates contradict planned dates includes determining whether a summary task start date occurs before all of the start dates of the subtasks comprising the summary task.

15. The computer-readable medium of claim 12, wherein determining when a summary task's calculated roll-up dates contradict planned dates includes determining whether a summary task start date occurs after all the finish dates of the subtasks of the summary task.

16. The computer-readable medium of claim 12, wherein determining when a summary task's calculated roll-up dates contradict planned dates includes determining whether a summary task finish date occurs after all the finish dates of the subtasks of the summary task.

17. The computer-readable medium of claim 12, wherein determining when a summary task's calculated roll-up dates contradict planned dates includes determining whether a summary task finish date occurs before all the finish dates of the subtasks of the summary task.

* * * * *